UNITED STATES PATENT OFFICE.

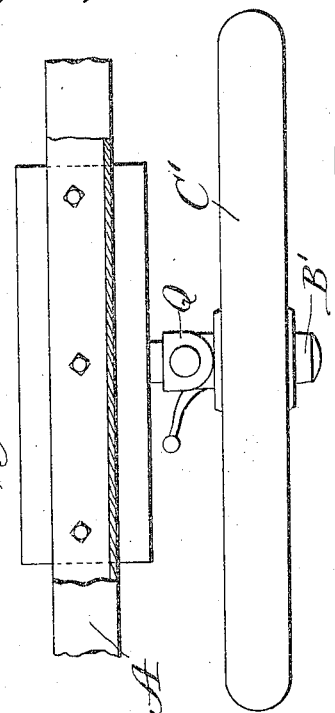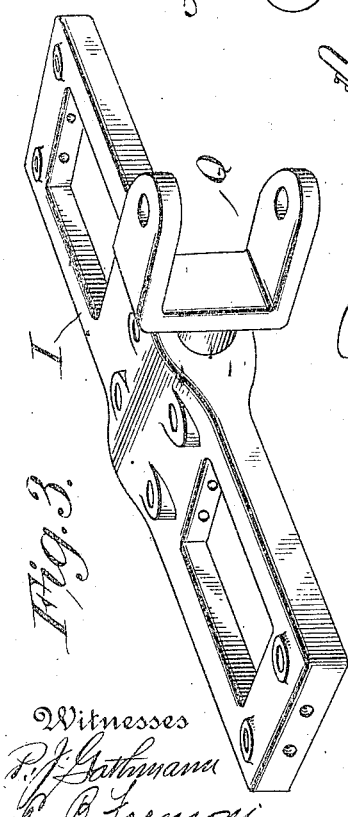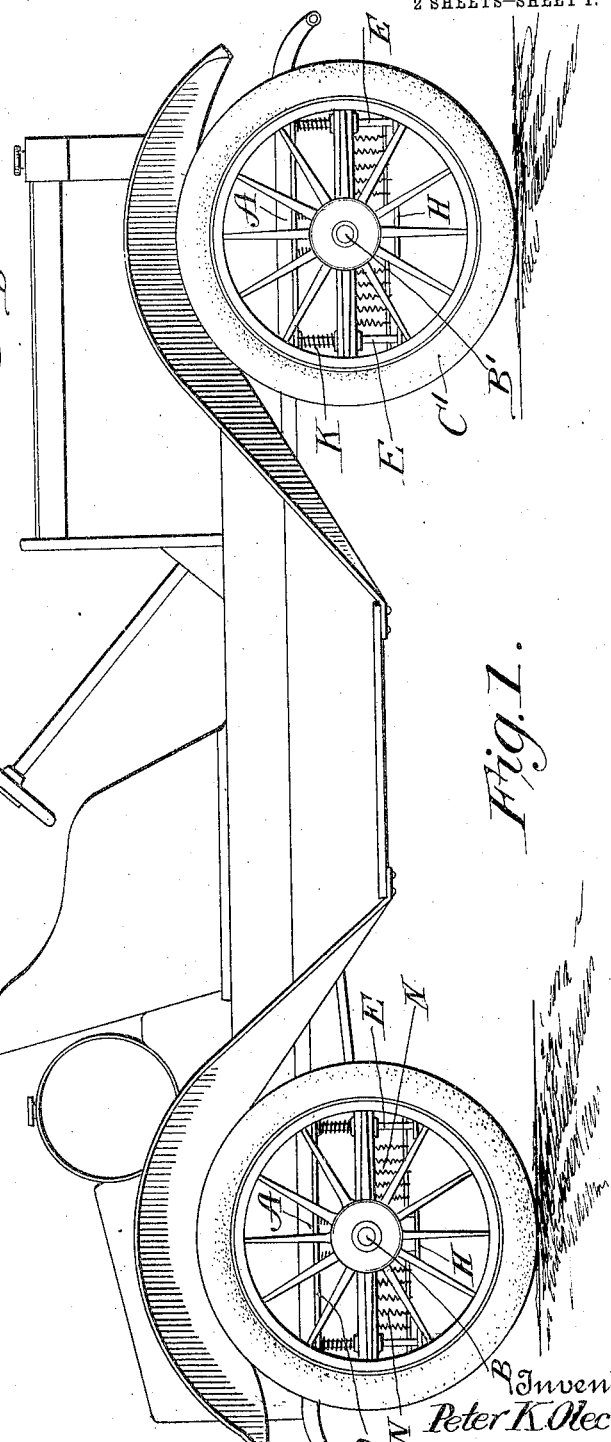

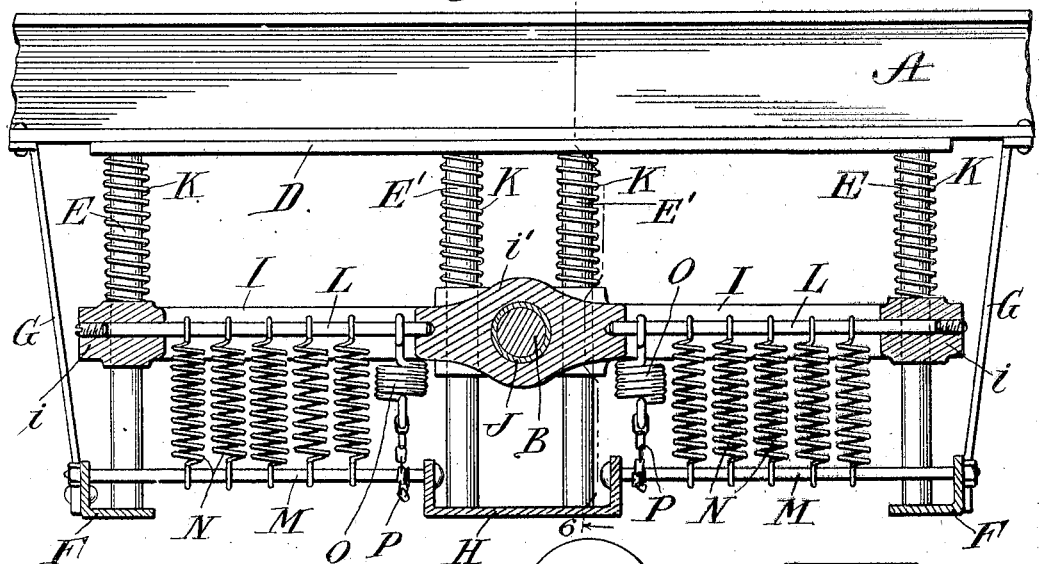
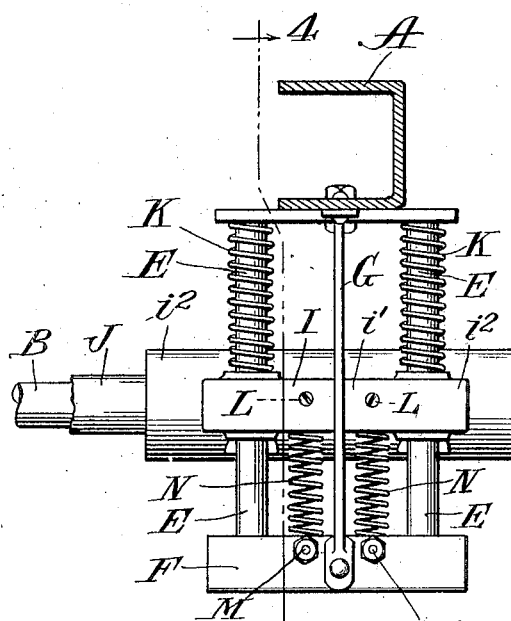
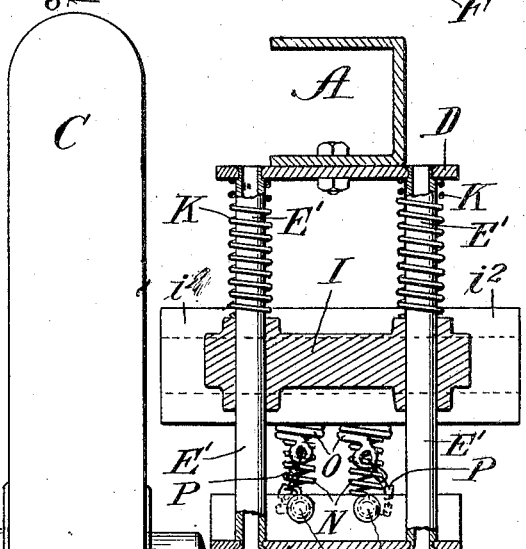

PETER K. OLECHNA, OF SCHENECTADY, NEW YORK.

SHOCK-ABSORBER FOR VEHICLES.

1,104,380.

Specification of Letters Patent. Patented July 21, 1914.

Application filed March 6, 1914. Serial No. 822,925.

*To all whom it may concern:*

Be it known that I, PETER K. OLECHNA, a subject of the Emperor of Russia, (who has declared his intention of becoming a citizen of the United States,) residing in Schenectady, in the county of Schenectady and State of New York, have invented certain new and useful Improvements in Shock-Absorbers for Vehicles, of which the following is a specification.

My invention relates particularly to the running gear of automobiles and especially to that part of the running gear known as the shock absorber.

The object of my invention is to so mount the running wheels that they may be yieldingly supported in a novel way whereby the vehicle may be made easy running and comfortable.

In carrying out my invention I secure to the under frame of the vehicle stationary frames which support and guide floating frames which are spring supported and to which the axles of the vehicle are connected in such manner that the vehicle is so cushioned by the expansion and compression of the springs that all ordinary, as well as unusual or violent, shocks are completely absorbed.

My improvements are illustrated in the accompanying drawings, in which,

Figure 1 shows a side elevation of an automobile with my improvements applied. Fig. 2 is a detail view partly in top plan and partly in section showing how one of the front wheels is connected by my improved shock absorber to the under frame of the vehicle. Fig. 3 is a perspective view of one of the floating frames of the shock absorber to which one of the front wheels is connected. Fig. 4 is a view on an enlarged scale in vertical section on the line 4—4 of Fig. 5 showing certain details of construction of one of the shock absorbers for the rear axle. Fig. 5 is a view on an enlarged scale showing an end elevation of one of the rear shock absorbers and certain parts connected therewith. Fig. 6 is a detail view in transverse section on the line 6—6 of Fig. 4.

The vehicle body may be of any ordinary construction. Fig. 1 shows a typical form of automobile, A indicating the under frame, or frame of the running gear which may be of channel iron, as shown, or of other suitable form. The rear axle B may be made of one piece and connected to the rear wheels C in any suitable way, while the front wheels C' may be attached to stud axles B'. The shock absorbers for the front and rear wheels and axles are of substantially the same construction with the exception that those for the rear axle are constructed to allow the latter to extend through and connect the rear wheels, while those at the front carry brackets to receive the stud axles of the front wheels.

The shock absorber constructed in accordance with my invention for the rear wheels and axle is shown in detail in Figs. 4, 5 and 6. Each one of these shock absorbers comprises a top piece D which is firmly attached to the frame A of the vehicle. From this top piece depend a plurality of posts E, E'. Preferably eight such posts are employed. The posts E are attached to the front and rear ends of the top piece D and at their lower ends they are attached to angle pieces F which are connected by brace rods G to the frame of the vehicle. The posts E' are only a short distance apart in front and rear of the axle B and they are connected at their lower ends to a channel piece H. The members described constitute a rigid frame rigidly connected to the under frame of the vehicle. I indicates a floating frame which is also a skeleton frame and has end portions $i$ through which the posts E extend and middle portion $i'$ through which extend the posts E'. This middle portion $i'$ is formed with bosses $i^2$ which receive a tubular bushing J through which the axle B extends. Compression springs K are interposed between the bottom of the top piece D and the top of the floating frame I for the purpose hereinafter described. Rods L are firmly secured to and connect the end pieces $i$ and intermediate piece $i'$ of the floating frame and rods M are firmly secured to and connect the angle pieces F and the channel piece H. As shown there are four rods L and four rods M, but this number may be varied. The rods L and M are connected, as shown, by vertically arranged coiled springs N, and I also employ stouter springs O which are connected directly with the rods L and are connected by means of chains P with the rods M. In this way the rear portion of the vehicle body is evenly supported and it will be understood that the weight of the vehicle body will cause the floating frame to rise or approach the under frame of the vehicle and place the springs N under tension and the springs K under compression. Shocks are efficiently absorbed by this construction and when any abnormal or unusual obstruction is encountered and the springs N are abnormally distended, the springs O come into operation and prevent the floating frame from striking against the under frame of the vehicle. As before stated, the shock absorbers for the front wheels are substantially the same as those for the rear wheels, the principal difference being that at the front of the vehicle the stud axles B' of the front wheels are connected to brackets Q firmly attached to the floating frame I, as shown in Figs. 2 and 3.

It will be understood that while I have specified the use of eight posts and have shown a certain number of springs N and O, this number may be varied without departing from the novel features of my invention.

I claim as my invention,

1. A shock absorber for vehicles, comprising a stationary frame, consisting of a top piece, a bottom comprising end pieces, an intermediate piece and rods connecting said end and intermediate pieces, posts connecting the top piece with said bottom pieces, a floating frame within said stationary frame and guided by said posts, compression springs interposed between the top piece of said stationary frame and said floating frame, and extension springs connected with the bottom of the stationary frame and with said floating frame.

2. A shock absorber for vehicles, comprising a stationary frame consisting of a top portion and a bottom portion, posts connecting the top and bottom portions of the frame, a floating frame within said stationary frame comprising end pieces, an intermediate piece and rods interposed between the end and intermediate pieces, compression springs interposed between the top of the frame and said floating frame, and extension springs connected with the bottom of the stationary frame and with the rods of the floating frame.

3. A shock absorber for vehicles, comprising a stationary frame, a floating frame arranged within the stationary frame and guided thereby, compression springs in said stationary frame above the floating frame, extension springs connecting the bottom of said stationary frame with said floating frame, extension springs of stronger tension than those first mentioned, connections between said springs of stronger tension and the floating frame, and chains connecting said last mentioned springs with the bottom of the stationary frame.

In testimony whereof, I have hereunto subscribed my name.

PETER K. OLECHNA.

Witnesses:
GORLYEL WOROLIK,
LUDWIK NOWINSKI.